United States Patent [19]

Baer et al.

[11] Patent Number: 4,665,529

[45] Date of Patent: May 12, 1987

[54] LASER DIODE PUMPED SOLID STATE LASER WITH MINIATURIZED QUICK DISCONNECT LASER HEAD

[75] Inventors: Thomas M. Baer, Mountain View; Mark S. Keirstead, San Jose, both of Calif.

[73] Assignee: Spectra-Physics, Inc., San Jose, Calif.

[21] Appl. No.: 864,928

[22] Filed: May 19, 1986

[51] Int. Cl.[4] .............................................. H01S 3/08
[52] U.S. Cl. .................... 372/107; 372/108; 372/92; 372/109; 350/96.18
[58] Field of Search ............... 372/107, 108, 109, 92; 350/96.18

[56] References Cited

U.S. PATENT DOCUMENTS

| | | | |
|---|---|---|---|
| 3,894,789 | 7/1975 | Kobayashi et al. | 350/96.18 |
| 3,982,201 | 9/1976 | Rosenkrantz | 372/75 |
| 4,035,742 | 7/1977 | Schniffner | 372/69 |
| 4,199,222 | 4/1980 | Ikushima et al. | 350/96.18 |
| 4,281,891 | 8/1981 | Shinohara et al. | 350/96.18 |
| 4,383,318 | 5/1983 | Barry et al. | 372/6 |
| 4,387,297 | 6/1983 | Swartz et al. | 235/462 |
| 4,398,790 | 8/1983 | Righini et al. | 350/96.18 |
| 4,409,470 | 10/1983 | Shepard et al. | 235/472 |
| 4,447,119 | 5/1984 | Beasley | 350/96.18 |
| 4,490,020 | 12/1984 | Sakaguchi et al. | 350/96.18 |

*Primary Examiner*—Leon Scott, Jr.
*Attorney, Agent, or Firm*—Paul Davis

[57] ABSTRACT

A compact laser head for a solid state laser has a miniaturized laser rod and output coupling mirror which form a miniaturized laser cavity. A miniaturized frequency doubler crystal placed in the cavity provides frequency doubled output. The laser head is connected by an optical fiber to a separate power supply which contains a laser diode pumping source. A quick disconnect connector enables the fiber optic to be easily connected to the laser head. Pumping radiation is transmitted through the optical fiber to longitudinally end pump the laser rod using fiber coupling imagery. The fiber is aligned with the rod by the connector and the pumping radiation is imaged into the rod by a focussing sphere. The pumping volume is matched to the lasing volume which is determined by the cavity geometry. The quick disconnect laser head allows interchange of different heads with different output characteristics while using a single power supply.

20 Claims, 3 Drawing Figures

LASER DIODE PUMPED SOLID STATE LASER WITH MINIATURIZED QUICK DISCONNECT LASER HEAD

BACKGROUND OF THE INVENTION

The invention relates generally to solid state lasers such as Nd:YAG lasers and more particularly to compact packaging of solid state lasers.

U.S. patent application Ser. No. 730,002, filed May 1, 1985, and CIP application Ser. No. 811,546, filed Dec. 19, 1985, described solid state lasers which included a laser rod end pumped by a laser diode. The pumping volume of the laser diode was matched to the laser rod to optimize pumping efficiency and the laser cavity was configured to provide a beam waist within the cavity at which a frequency doubler crystal could be placed. The laser diode was packaged in the same assembly. Each laser was designed to produce a particular output frequency determined by the material of the laser rod and the presence or absence of a doubler crystal. However, for the widest variety of applications and for the greatest ease of use, it is desirable to have a laser with the most compact packaging possible and a laser with interchangeable components so that a number of different output characteristics would be available from the same laser system. Since the output characteristics are largely determined by the design and components of the laser cavity, it is desirable to have a compact laser head which is a separate unit from the rest of the laser system and which can be readily coupled and decoupled to the rest of the system. Thus laser heads producing different output characteristics can be readily substituted. It is also desirable to end pump the laser rod.

U.S. Pat. Nos. 4,387,297 issued June 7, 1983 to Swartz et al. and 4,409,470 issued Oct. 11, 1983 to Shepard et al. disclose a hand held typically gun-shaped laser-tube based laser scanning head. The head may also be streamlined or box-shaped. The head typically has a volume of 50-100 cubic inches and weights 1-2 pounds. The use of a semiconductor laser diode in place of a He-Ne laser tube allows the lower sizes of the indicated ranges to be achieved. Power supplies, scanning motors and mirrors, and other circuitry are all included in the scanner head. The head is coupled to other components such as computer and data storage circuitry through an electrical cable.

U.S. Pat. No. 4,383,318 issued May 10, 1983 to Barry et al. shows a laser pumping system in which optic fibers in a fan-in arrangement concentrate energy from an array of LED's or diode lasers to points along the length of a laser rod.

U.S. Pat. No. 4,035,742 issued July 12, 1977 to Schiffner shows a device for optically pumping solid state lasers having a waveguide between the pumping source and laser rod disposed at an angle to the surface of the rod determined by the index of refraction of the waveguide.

U.S. Pat. No. 3,982,201 issued Sept. 21, 1976 to Rosenkrantz et al. shows an end pumped solid state laser in which a diode laser array is pulsed at a rate and duty cycle to produce Cw operation.

SUMMARY OF THE INVENTION

Accordingly it is an object of the invention to provide a solid state laser having a miniaturized laser head.

It is also an object of the invention to provide a compact solid state laser head which may be easily connected or disconnected from a laser diode pumping source.

It is a further object to provide a compact solid state laser head which is longitudinally end pumped.

It is another object of the invention to provide a solid state laser system with readily interchangeable laser heads.

The invention is a laser diode pumped solid state laser having compact packaging with a miniaturized laser head coupled through a fiber optic to a power supply which includes a laser diode. The laser head contains a laser rod mounted in a housing with optical components to define a laser cavity and provide output coupling. A quick disconnect coupling for the fiber optic to the laser head is provided and the laser head contains an imaging lens to image the output of the fiber optic into the laser rod to longitudinally end pump the laser rod. The fiber optic allows the laser rod to be end pumped by the laser diode in a separate power supply by a pumping scheme using fiber coupling imagery. The laser head housing is made as small as possible and all components therein are miniaturized. The use of particular mounting means for the components, in particular ball and tube mounts, allows the use of very small components and the least amount of space. The components are positioned to match the pumping volume of the laser diode pumping source which is transmitted to the laser head through an optic fiber and imaged into the laser rod to the lasing volume of the rod. By position and geometry of the optical elements defining the laser cavity a desired beam profile in the cavity can be produced, which according to one aspect of the invention, are used to provide $TEM_{00}$ output A frequency doubler crystal can also be mounted in the laser head in the optical cavity, preferably at a beam waist, to provide frequency doubled output. In accordance with the invention, various quick disconnect heads are readily interchangeable and operable with a single power supply which includes a laser diode pumping source. Each head can be designed to provide particular output characteristics. Thus a very versatile system is provided in which only the laser heads are interchanged. The small size of the laser head and the ability to move the laser head a distance from the power supply are highly advantageous for a variety of applications. Furthermore, the laser diode can be replaced when necessary without any adjustment or realignment of the laser head components.

DETAILED DESCRIPTION OF THE PREFERRED EMBODIMENT

Figure 1:
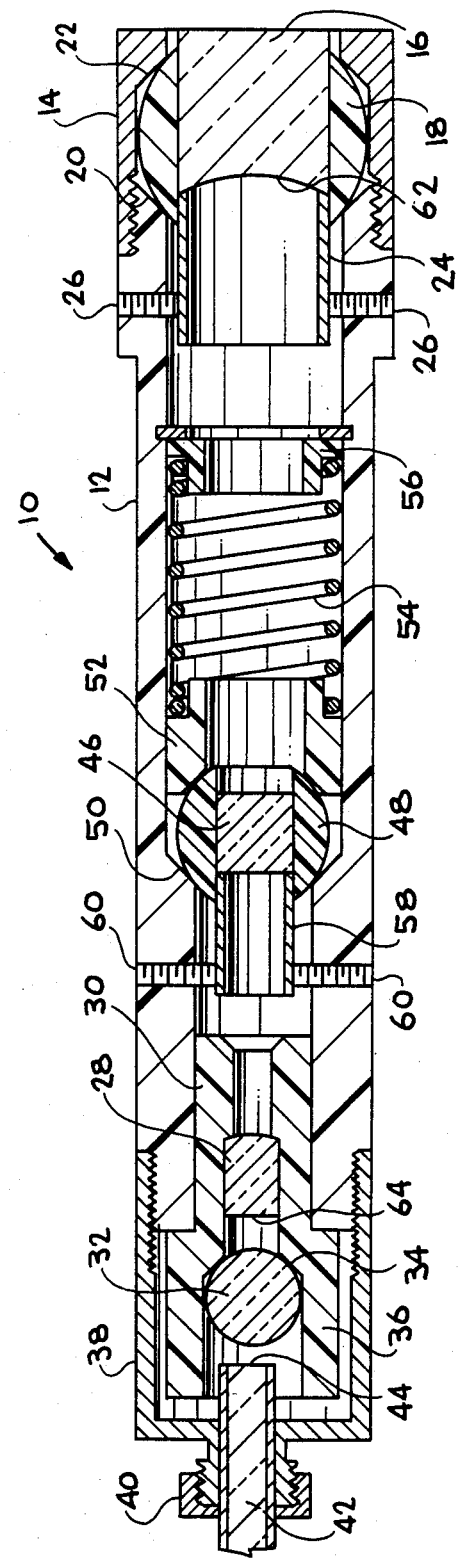
FIG. 1 is a sectional view of a quick disconnect miniaturized laser head according to the invention.

A quick disconnect compact solid state laser head 10 in accordance with the invention is shown in FIG. 1 The laser head 10 has a hollow housing 12 which is preferably substantially cylindrical or tubular and typically made of stainless steel. At one end of housing 12 is end cap 14, typically made of plastic, e.g. teflon impregnated Delrin, which screws onto or is otherwise attached to housing 12. A mirror 16 is mounted at the end of housing 12 and inside end cap 14. Mirror 16 preferably has a concave inner surface and substantially flat outer surface. Mirror 16 forms a part of the laser optical cavity and is the output coupler for the laser cavity. Mirror 16 is held in a ball mount 18 which is rotatably mounted in end cap 14 between beveled edge 20 of housing 12 and beveled edge 22 of end cap 14. Ball mount 18 has a hollow tube 24 extending therefrom into the interior of housing 12. Set screws 26 extend through housing 12 and contact tube 24 so that the angular position of ball mount 18 can be adjusted; there are typically three or four set screws 26 spaced around the circumference of the housing.

Near the opposite end of housing 12 is mounted a solid state laser rod 28 which is held in a holder or mount 30 which fits within the housing 12; the rod 28 may be held in place by a set screw (not shown) which also stresses the rod to polarize the output. Alternatively, laser rod 28 can be mounted in a ball mount if desirable to adjust its angular orientation. Mount 30 also holds a spherical lens or focussing sphere 32 in a spaced relationship to laser rod 28; tne lens 32 may be epoxied in place. Spherical lens 32 is mounted against beveled edge 34 in end portion 36 of mount 30; end portion 36 is wider than the portion of mount 30 which holds laser rod 28. An end cap 38 is placed at the end of housing 12 and contains the end portion 36 of mount 30. End cap 38 is typically made of teflon impregnated Delrin. End cap 38 also contains coupling means 40 which allow an optical fiber 42 to be connected to laser head 10. Coupling means 40 is preferably a standard fiber optic connector, either bayonet type or SMA (screw-on) type, e.g. Amphenol 905 and 906 series connectors from Allied Corp., or any other coupling means which provides fiber alignment and quick connect/disconnect. Coupling means 40 holds optical fiber 42 so that its end 44 is in close proximity to spherical lens 32. Laser rod 28, spherical lens 32 and the end 44 of optical fiber 42 are positioned so that the output of optical fiber 42 is imaged into laser rod 28 to provide efficient longitudinal end pumping of laser rod 28. Coupling means 40 provides proper alignment of fiber 42 whicn is reliable each time the fiber is connected to the laser head.

A frequency doubler crystal 46 may also be mounted in the housing 12 in order to produce a frequency doubled output. Doubler crystal 46 is mounted in a ball mount 48 which is held against beveled edge 50 on the interior of housing 12 by ball retainer ring 52 which is spring loaded by spring 54 which is held by spring retainer 56 which is mounted in housing 12. Ball mount 48 has a hollow tube 58 extending therefrom longitudinally in housing 12. Set screws 60 extend through housing 12 and contact tube 58 so that the angular position of ball mount 48 can be adjusted; typically three or four set screws 60 are used.

In accordance with the principles described in U.S. patent application Ser. No. 730,002, filed May 1, 1985, and CIP application Ser. No. 811,546, filed Dec. 19, 1985, which are herein incorporated by reference, and the packaging techniques of the present invention a very short optical cavity is produced. The optical cavity is defined by surface 62 of mirror 16 and surface 64 of laser rod 28. Surface 64 is transmissive to pumping radiation but reflective to the lasing output of laser rod 28 and the frequency doubled radiation in cases where the doubler crystal 48 is used. By proper selection of the curvature of the optical surfaces and the distances between the optical surfaces, the beam profile within the cavity is controlled. In particular a beam waist is formed within the cavity which provides the optimal position for placement of the doubler crystal 46. Also by mode matching the beam profile to the cavity dimensions single transverse mode operation, e.g., $TEM_{00}$ mode, can be achieved.

Figure 2:
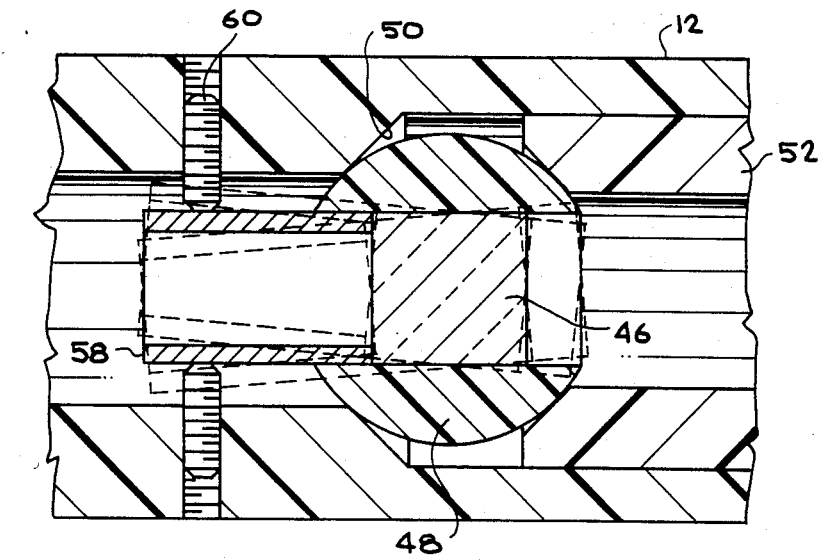
FIG. 2 is a sectional view of a ball and tube mount holding a doubler crystal in the laser head.

The optical elements 16, 28, 46 are provided in housing 12 at the appropriate positions according to a particular cavity design. The elements are centered along the bore of housing 12. To perform the initial alignment of optical elements 16 and 46, ball mounts 18 and 48, respectively, are rotated. The angular adjustment of doubler crystal 46 in ball mount 48 is illustrated in FIG. 2. The crystal 46 is mounted in a channel through ball mount 48. Ball mount 48, typically made of teflon impregnated aluminum, is rotatably held between beveled edge 50 of housing 12 and retaining ring 52. Tube 58 projects from ball mount 48 into the bore of housing 12. A plurality of set screws 60, typically three or four, extend through the housing 12 and contact tube 58. By adjustment of set screws 60, the tube 58 can be oriented in different positions, as illustrated, thereby rotating attached ball mount 48 and cnanging the orientation of crystal 46. These ball mounts provide a very compact configuration and ease of alignment; a ball mount could be used for the laser rod.

Figure 3:
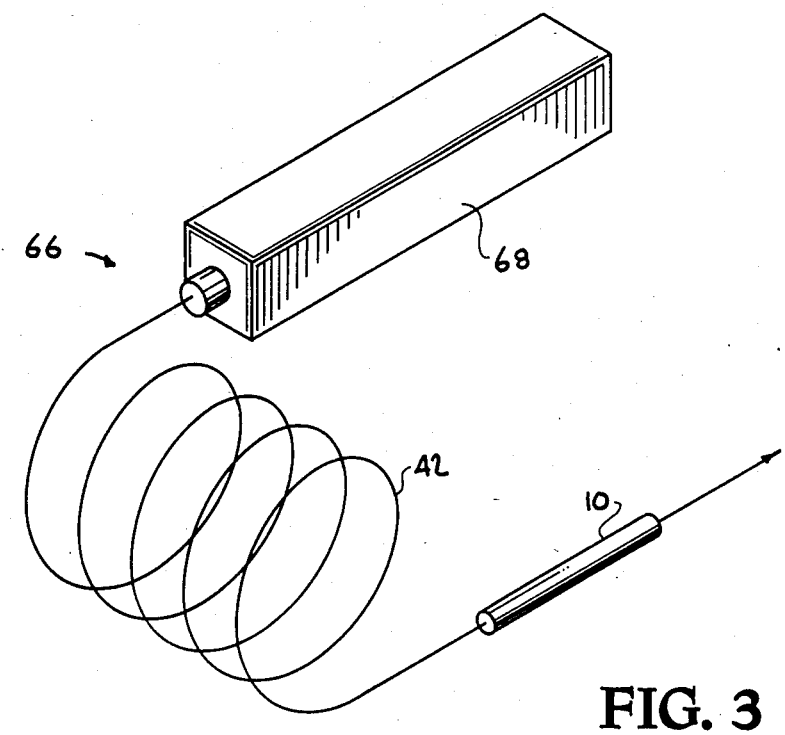
FIG. 3 is a perspective view of a laser system showing the laser head connected to a power supply through a fiber optic.

A significant feature of the invention is the longitudinal pumping scheme using fiber coupling imagery. A view of the overall laser system 66 is shown in FIG. 3 in which laser head 10 is coupled by optical fiber 42 to a power supply 68. Power supply 68 contains a laser diode pumping source which is suitable for pumping the solid state laser rod in laser head 10. The pumping radiation is transmitted from power supply 68 to laser head 10 by optical fiber 42. As shown in FIG. 1, the pumping radiation transmitted through optical fiber 42 is imaged by spherical lens 34 onto the end face 64 of laser rod 28. In accordance with the invention the image size from the fiber is matched to the mode size in the laser rod. The image size from the fiber is determined by the fiber diameter and divergence of the light from the fiber. The distances from the spherical lens to the fiber and to the laser rod determine the imaging ratio. A spherical lens (focussing sphere) is preferred for its ease of centration in housing 12 and for its lack of alignment problems. The lasing volume in the rod is determined by the cavity configuration, i.e., the length of the cavity and the curvature of the output coupler mirror and front surface of the laser rod. Thus for any desired cavity configuration, the pumping radiation from the fiber optic can be imaged into the desired lasing volume of the rod for the most efficient operation. The use of the fiber optic coupling allows the laser head to be very compact and contain only the optical elements while all the electronic and other elements, including the pumping source, can be placed in a separate, stationary power supply. Since the optical fiber can be quite long, this system configuration provides great flexibility in the use of the laser, making the laser head highly portable. Also because of the quick disconnect feature, different laser head can be readily interchanged. Thus a variety of different laser heads which have different output characteristics can be used, essentially giving the user the benefit of several different systems but without the expense and redundancy of entire separate systems since only a new laser head is required with the same power supply to have an entire new system. Since the laser head contains only the optical components, the availability of different outputs becomes relatively economic. Also down time in the case of a laser head failure is minimized since a replacement head can easily be substituted. A further advantage to the use of fiber optic coupling imagery for pumping the rod is that in the event that the pumping source must be replaced, the laser diodes can be easily replaced and matched into the fibers without need for realignment of the laser head since the imaging of the fiber into the rod is not affected.

As an illustrative embodiment of the invention, a preferred laser head configuration is about 8.4 cm long and about 1.0 cm in diameter. The laser rod is a Nd:YAG crystal which is about 5 mm long and 3 mm in diameter. The spherical lens is 5 mm diameter; there is a space of about 1.8 mm between between the end of the fiber and the spherical lens and a space of about 3 mm from the lens to the end of the laser rod. The doubler crystal is a KTP crystal about 5 mm by 3 mm by 3 mm; the doubler crystal is 2.2 cm from the laser rod and 3.1 cm from the output coupler mirror. A number of different optical fibers can be used, the smaller the fiber, the higher the brightness, but the greater difficulty in alignment. A 200 micron diameter fiber, e.g., NRC FC-PC, a 125 micron diameter fiber, e.g. Corning 1504, and a 100 micron diameter fiber, e.g., NRC FC-MLD, all available from Newport Research Corporation, Fountain Valley, Calif., can be used. In a particular embodiment, a 200 micron fiber is used with 1:1 imaging to produce a 200 micron diameter mode volume in a 3 mm diameter Nd:YAG laser rod. By mode matching mode size is then 200 micron, and only $TEM_{OO}$ output is obtained. The principles of the invention can be applied to form even smaller laser heads, as small as 4 cm length and 7 mm diameter. Laser rods with lengths of about 1 mm and doubler crystals with lengths of about 2 mm can be used.

Changes and modifications in the specifically described embodiments can be carried out without departing from tne scope of tne invention which is intended to be limited only by the scope of the appended claims.

We claim:

1. A compact laser head, comprising:
 a compact hollow housing;
 a miniaturized solid state laser rod mounted in the housing;
 a miniaturized output coupling mirror mounted in the housing;
 the laser rod and output coupling mirror forming a miniaturized laser cavity;
 precision optical alignment connector means mounted to the housing for connecting an optical fiber to the housing, said connector means providing quick disconnect of the optical fiber to the housing and optical alignment of an output from the fiber with the laser cavity; and
 means for matching an image size of the optical fiber connected to the housing to a mode size of the laser rod, allowing different laser heads having different output characteristics to be interchanged with the optical fiber; and
 imaging means mounted in the housing for imaging the output of the optical fiber into the laser rod to longitudinally end pump the laser rod.

2. The compact laser head of claim 1 having dimensions of about 4 to 8 cm length and 0.7 to 1 cm diameter.

3. The compact laser head of claim 1 wherein the laser rod is a Nd:YAG crystal.

4. The compact laser head of claim 1 further including a miniaturized frequency doubler crystal mounted in the housing in the miniaturized laser cavity.

5. The compact laser head of claim 1 wherein the miniturized output coupling mirror is mounted in a ball mount which is rotatably mounted in the housing.

6. The compact laser head of claim 5 wherein the ball mount includes a projecting tube extending longitudinally in the housing and further including position adjustment means mounted in the housing and contacting the projecting tube for rotating the ball mount.

7. The compact laser head of claim 4 wherein the miniaturized frequency doubler crystal is mounted in a ball mount which is rotatably mounted in the housing.

8. The compact laser head of claim 7 wherein the ball mount includes a projecting tube extending longitudinally in the housing and further including position adjustment means mounted in the housing and contacting the projecting tube for rotating the ball mount.

9. The compact laser head of claim 4 wherein tne laser cavity produces a beam profile having a beam waist and the frequency doubler crystal is mounted at the beam waist.

10. The compact laser head of claim 1 wherein the imaging means is a focusing sphere.

11. The compact laser head of claim 1 wherein the laser cavity is mode matched to the lasing volume of the laser rod to produce substantially $TEM_{OO}$ mode output.

12. The compact laser head of claim 1 wherein the precision optical alignment connector means is a bayonet type fiber optic connector.

13. The compact laser head of claim 1 wherein the precision optical alignment connector means is a screw-on type fiber optic connector.

14. A solid state laser system comprising:
 a compact laser head of claim 1;
 a laser power supply including a laser diode pumping source;
 an optical fiber connected from the power supply to the laser head to transmit pumping radiation from the pumping source to the laser head.

15. The laser system of claim 14 wherein the laser head includes a Nd:YAG laser rod.

16. The laser system of claim 14 wherein the laser head further includes a miniaturized frequency doubling crystal mounted in the miniaturized laser cavity.

17. A compact laser head, comprising:
 a compact hollow housing;
 a first end cap attached to one end of the housing;
 a first ball mount rotatably mounted between a first beveled edge on the inside of the housing and the first end cap;
 a miniaturized output coupling mirror mounted in the first ball mount;
 the first ball mount having a tube extending therefrom longitudinally into the housing;
 first position adjustment means extending through the housing and contacting the tube of the first ball mount for rotating tne first ball mount;
 a holder mounted in the other end of the housing;
 a miniaturized solid state laser rod mounted in the holder;
 the laser rod and output coupling mirror forming a miniaturized laser cavity;
 imaging means mounted in the holder in a spaced relationship to the laser rod;
 a second end cap attached to the housing and surrounding the holder;

quick disconnect means extending from the second end cap for connecting an optical fiber to the housing so that the imaging means images the output of the optical fiber into the laser rod to longitudinally end pump the laser rod.

18. The compact laser head of claim 17, further comprising:
   a second ball mount rotatably mounted against a second beveled edge on the inside of the housing;
   a miniaturized frequency doubler crystal mounted in the second ball mount;
   a retaining ring contacting the second ball mount;
   a spring contacting the retaining ring;
   a spring holder fixedly mounted in the housing for compressing the spring against the retaining ring to hold the second ball mount against the second beveled edge;
   the second ball mount having a tube extending therefrom longitudinally into the housing;
   second position adjustment means extending through the housing and contacting the tube of the second ball mount for rotating the second ball mount.

19. A solid state laser system, comprising:
   a compact laser head of claim 18;
   a laser power supply including a laser diode pumping source;
   an optical fiber connected from the power supply to the laser head to transmit pumping radiation from the pumping source to the laser head.

20. A solid state laser system, comprising:
   a compact laser head of claim 17;
   a laser power supply including a laser diode pumping source;
   an optical fiber connected from the power supply to the laser head to transmit pumping radiation from the pumping source to the laser head.

* * * * *